United States Patent

[11] 3,602,724

| [72] | Inventor | Archibald W. Smith<br>Briarcliff Manor, N.Y. |
|---|---|---|
| [21] | Appl. No. | 355,194 |
| [22] | Filed | Mar. 27, 1964 |
| [45] | Patented | Aug. 31, 1971 |
| [73] | Assignee | International Business Machines<br>Corporation<br>New York, N.Y. |

[54] OPTICAL NONLINEAR DEVICES
5 Claims, 9 Drawing Figs.

[52] U.S. Cl. ................................................ 307/88.3,
321/69, 330/4.5, 331/94.5
[51] Int. Cl. ...................................................... H02m 5/00
[50] Field of Search ............................................ 321/69;
307/88.3

[56] References Cited
UNITED STATES PATENTS
3,371,265  2/1968  Woodbury et al. ............ 307/88.3

OTHER REFERENCES
Eckhardt et al., " Physical Review Letters," Dec. 1, 1962, pp. 455– 457, 330-4.5

Primary Examiner—Roy Lake
Assistant Examiner—Darwin R. Hostetter
Attorneys—John E. Dougherty, Jr., Stephen J. Limanek, John F. Hanifin and J. Jancin, Jr.

ABSTRACT: A group of devices are set forth that individually employ a transparent nonlinear dielectric element, such as a piezoelectric crystal, in the cavity of a laser. The crystal serves to generate harmonics of the frequency generated by the laser. The light energy whose frequency is to be converted is retained in the laser cavity and the electric field within the cavity builds up to high values. The conversion efficiency is high because the harmonic electric field is proportional to the square of the fundamental electric field.

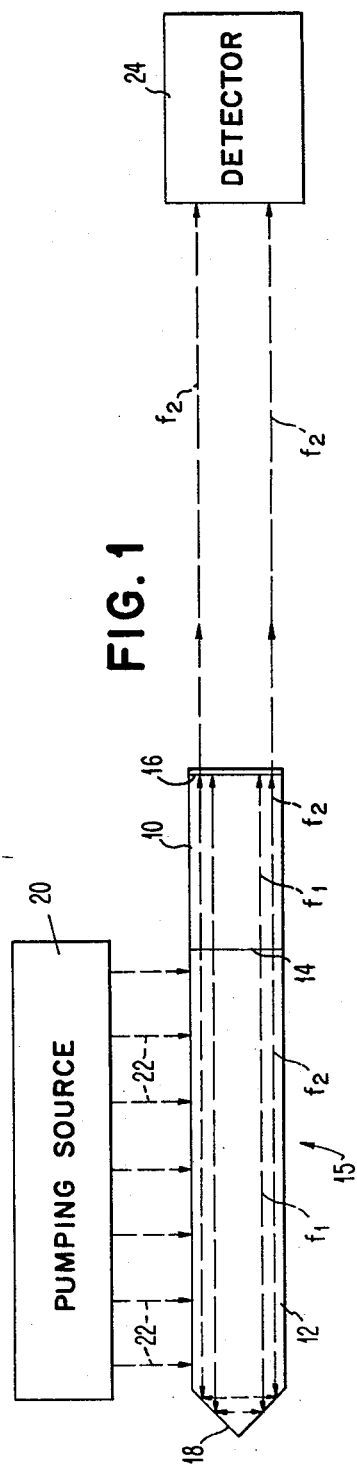
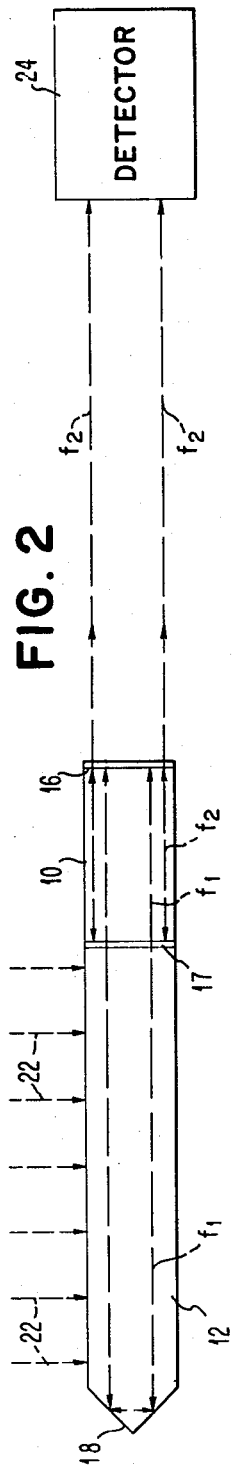
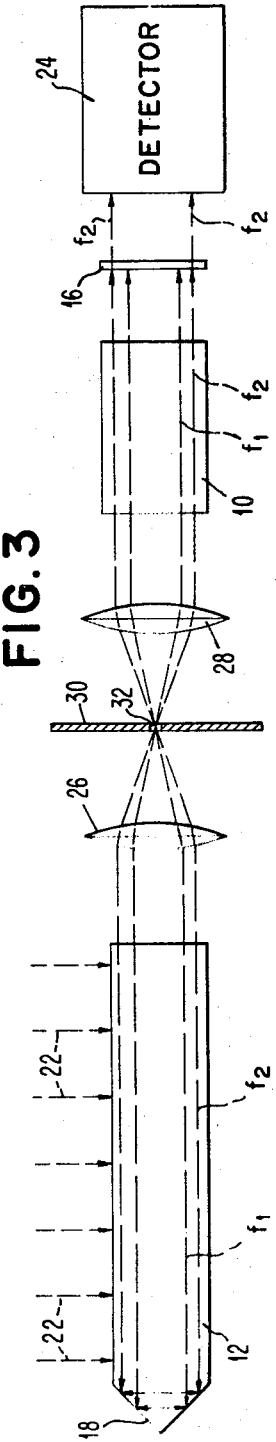
INVENTOR
ARCHIBALD W. SMITH

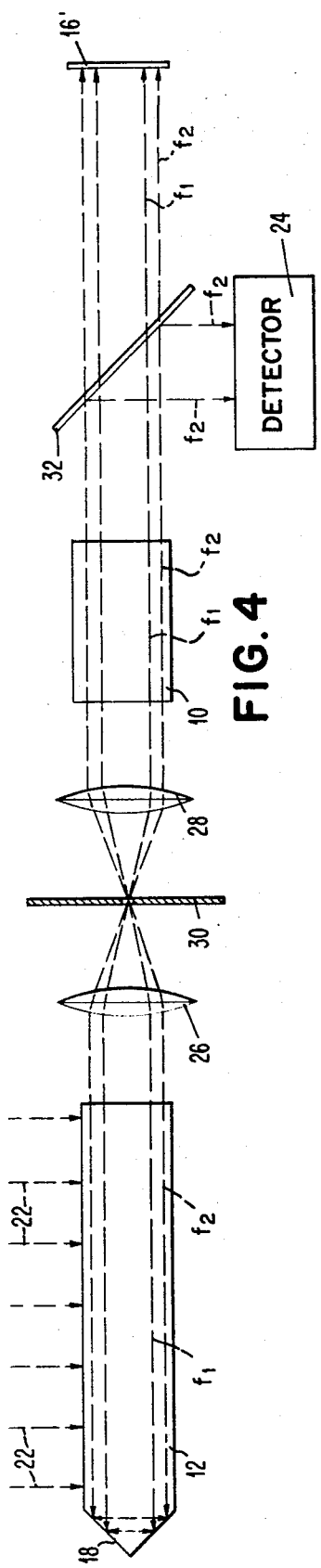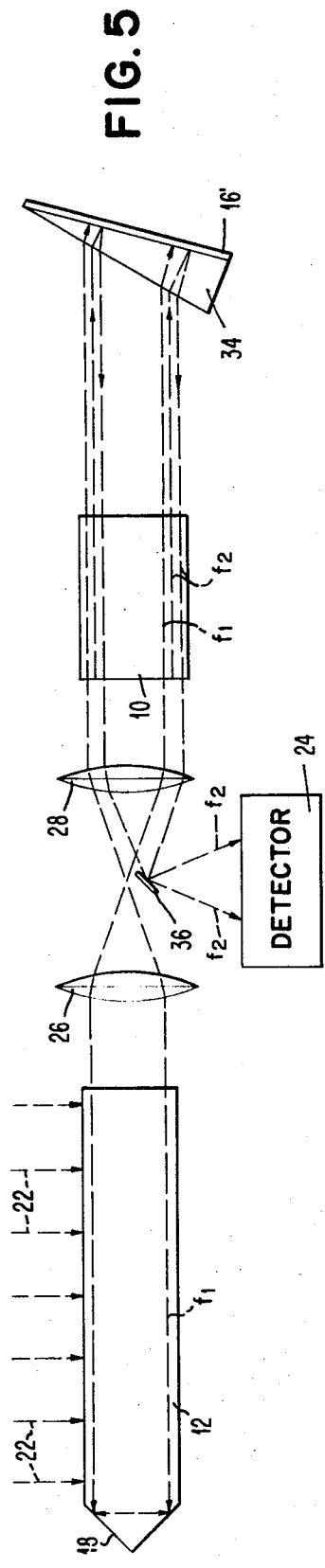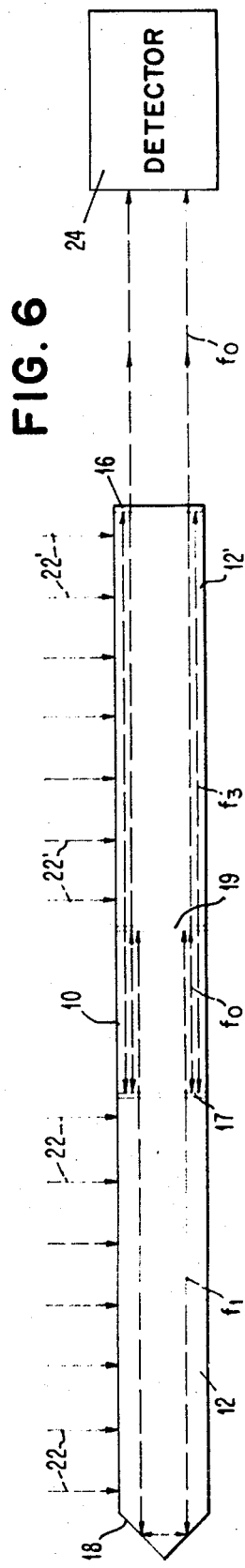
FIG. 4
FIG. 5
FIG. 6

OPTICAL NONLINEAR DEVICES

This invention relates to optical nonlinear devices and more particularly to optical devices providing higher conversion efficiency through the use of resonant structures.

Nonlinear devices, such as mixers, frequency converters and parametric amplifiers and oscillators operable at microwave frequencies have been known for several years. These known microwave devices have been, in many instances, of the traveling wave type, employing reactance elements which are disposed along a transmission line in lumped or distributed form, their parameters being periodically or continuously varied in value to provide amplification by well known nonlinear interactions between a plurality of waves. The reactance elements used have been either in the form of capacitors in inductors which are variable in capacitance or inductance value, respectively, in accordance with the voltage applied to or current passing through them, or in the form of nonlinear media as dense electron beams. Devices of this type have been discussed in the literature in articles such as "A Traveling Wave Ferromagnetic Amplifier" by Tein and Suhl in Proceedings of IRE, Apr. 1958, pp. 700–706 and "Parametric Amplification Along Non-Linear Transmission Lines" by R. W. Landauer in Journal of Applied Physics, Vol. 31, No. 3 pp. 479–484, Mar. 1960.

In general, in the known microwave nonlinear devices, there is an interrelationship among three waves such that the frequency of one of these waves is equal to the sum or difference of the other two waves. For example, the energy applied to a reactance element of one of the parametric devices for varying the reactance value thereof is commonly referred to as the pump energy and has a frequency generally substantially greater than the frequency of a signal which is to be amplified or established therein. The frequency of the pumping energy in the parametric device is equal to the sum of the frequencies of the signal and of an idler wave, which is produced in the device due to the interaction between the pump and signal voltages. In order to provide an effective conversion of energy from the pumping wave to the signal wave in a traveling wave parametric device, the velocity of propagation of the pumping and signal waves along the transmission path of this device must be substantially equal. Undesired combinations of the pump and signal waves are suppressed by designing the transmission path so that the velocity of propagation of the undesired frequencies is substantially different from the velocity of propagation of the pump frequency.

In addition to the traveling wave transmission line structure described hereinabove for producing the various frequencies or microwave coupled modes in nonlinear devices, coupled modes may be produced in suitable cavities which are tuned to desired modes.

It is also known, for example, as described in Physical Review Letters, Vol. 7, No. 4, Aug. 15, 1961, pp. 118–119 in an article entitled "Generation of Optical Harmonics," that an intense coherent optical beam produced by an optical maser or laser when focused onto a dielectric element produces optical harmonics due to inherent nonlinearities therein. The material used for the production of optic harmonics must have a nonlinear polarization characteristic and must be transparent to both the fundamental optical frequency and the desired harmonic frequency.

The interaction between waves, at least one of which is an optical wave, may be appreciably enhanced in optical nonlinear devices by employing traveling wave techniques. In this known traveling wave optical device one or more optical waves are applied to a nonlinearly polarizable medium capable of supporting a plurality of optical waves which are frequency related to the applied wave or waves and for which the wave velocities are matched in the supporting element, this latter condition expressing the requirement that this plurality of waves interferes constructively from point to point as they propagate through the supporting medium. For a more detailed description of such a traveling wave optical device reference may be had to U.S. Pat. application Ser. No. 205,951, filed June 28, 1962 by R. L. Garwin et al.

It is an object of this invention to provide an improved optical nonlinear device by employing larger interacting optical electric fields in the nonlinear material of the device.

It is another object of this invention to provide an improved optical nonlinear device by producing the interactions between frequency interrelated waves within a common optical source.

In accordance with the present invention an improved optical nonlinear device or system is provided by employing within the resonant structure or cavity of an optical maser or laser producing a given coherent optical wave a nonlinear transparent dielectric element and means for extracting from the cavity a wave frequency interrelated with the given wave.

An important advantage of the optical nonlinear device of the present invention is that it provides means for producing more intense optical waves particularly at frequencies other than that of the fundamental laser wave.

An important feature of the optical nonlinear device of the present invention is that more intense output optical waves are produced primarily by a mere rearrangement of elements in known devices or systems without an increase in input energy.

The foregoing and other objects, features and advantages of the invention will be apparent from the following more particular description of preferred embodiments of the invention, as illustrated in the accompanying drawings.

In the drawings:

FIG. 1 shows an embodiment of the system of the present invention for producing a harmonic of a fundamental optical wave wherein a common resonant structure is tuned to the fundamental wave and to the harmonic wave.

FIG. 2 shows an embodiment of the system of the present invention for producing a harmonic of a fundamental optical wave wherein the nonlinear dielectric element is disposed within a first cavity tuned to the fundamental and a second cavity tuned to the harmonic of the fundamental wave.

FIG. 3 shows an embodiment of the system of the present invention similar to that shown in FIG. 1 but which additionally includes a lens system disposed within the cavity.

FIG. 4 illustrates an embodiment of the system of the present invention similar to that illustrated in FIG. 3 but which utilizes a 45° beam splitter for extracting the harmonic wave.

FIG. 5 illustrates an embodiment of the system of the present invention somewhat similar to that shown in FIG. 3 but which utilizes a 30° prism for separating the harmonic from the fundamental wave.

FIG. 6 illustrates an embodiment of the system of the present invention which employs optical mixing.

Figure 7:
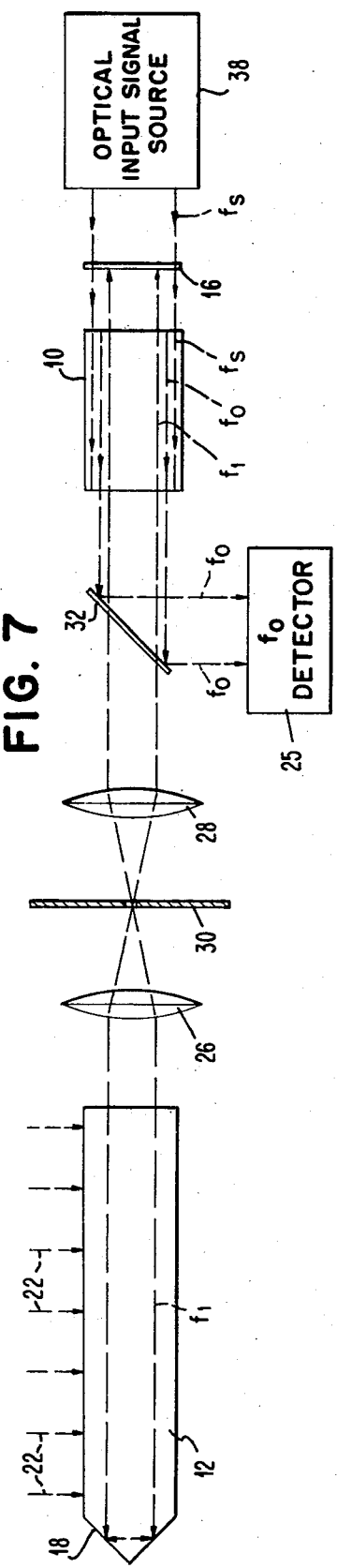
FIG. 7 illustrates another embodiment of the system of the present invention which employs optical mixing.

Referring to FIG. 1 in more detail there is shown an optical nonlinear device or system for producing a harmonic wave of a given fundamental wave which includes a nonlinear dielectric element or rod 10 transparent to both the fundamental and harmonic waves and an optical maser or laser active element or rod 12 aligned with the nonlinear dielectric element 10 so as to provide an interface 14 therebetween. The nonlinear dielectric element 10 may be of any suitable type, e.g., a piezoelectric crystal such as potassium dihydrogen phosphate, which is transparent to the given fundamental and harmonic waves, and the laser rod 12 may be made of any suitable material i.e., a negative temperature medium, such as aluminum oxide doped with chromium used in a so-called optically pumped ruby laser, which is capable of producing a coherent fundamental wave $f_1$. First reflecting means 16 providing a flat surface for totally reflecting the fundamental wave $f_1$ and reflecting most of its harmonic $f_2$ while transmitting a small percentage of the harmonic $f_2$ is disposed on the end of the nonlinear dielectric element 10 opposite that forming the interface 14 and second reflecting means 18 which is produced by forming the end of the laser rod 12 into a wedge shape having optically smooth surfaces, which arrangement is known as a rooftop reflector, for totally reflecting both the fundamental wave $f_1$ and harmonic wave $f_2$ is disposed opposite the end of the laser rod 12 forming the interface 14. The combination of the first and second reflecting means 16 and 18 forms a resonant cavity 15 for both the fundamental wave $f_1$ and the harmonic $f_2$. A pumping source 20 providing pumping radiation 22 in the absorption band of the laser rod 12 is arranged to apply the pumping radiation 22 to the surfaces of the laser rod 12. A detector 24, e.g., a vacuum photocell, is disposed without the cavity 15 to intercept the harmonic wave $f_2$ transmitted through the second reflecting means 16.

In the operation of the embodiment of the system of the invention illustrated in FIG. 1 of the drawing, the pumping radiation 22 from the pumping source 20 excites the laser rod 12 so as to produce the coherent fundamental wave $f_1$ in the cavity 15 defined by the first and second reflecting means 16 and 18. The fundamental wave $f_1$ emanates from the laser rod 12 through the interface 14 into the nonlinear dielectric element 10. When the fundamental wave $f_1$ passes through the nonlinear dielectric element 10, there is produced in the element 10, due to its nonlinearity, the harmonic wave $f_2$ of the fundamental wave $f_1$. The first and second reflecting means 16 and 18 are arranged not only to form a relatively high Q resonant cavity for the fundamental wave $f_1$ but also for the harmonic wave $f_2$ to produce standing waves between the first and second reflecting means 16 and 18 at both the fundamental and harmonic waves $f_1$ and $f_2$. By placing the nonlinear dielectric element 10 inside the cavity 15 instead of outside as in previous arrangements, a more intense harmonic wave $f_2$ is produced due to an improved conversion efficiency, since the fundamental electric field inside the cavity is inherently larger than that outside the cavity. The improvement in conversion efficiency, which is the ratio of harmonic to fundamental power, results from the fact that the fundamental electric field is proportional to the square of the harmonic electric field.

It should be understood that the phase velocities of the fundamental and harmonic waves $f_1$ and $f_2$ must be equalized in the nonlinear element 10 in order to obtain the desired results. In most nonlinear elements or crystals, the dispersion due to ultraviolet absorptions causes the harmonic to travel more slowly than the fundamental wave. It is known that this difference in velocity may be overcome by making use of birefringence which occurs in many crystals. In a negative uniaxial crystal, the extraordinary phase velocity $V^E$ is greater than the ordinary phase velocity $V^O$. Thus, if the maximum birefringence $V^E-V^O$, which occurs perpendicular to the optic axis, is greater than the dispersion between the harmonic and fundamental waves, a balance can be achieved by making the fundamental an ordinary wave and the harmonic an extraordinary wave. The direction of the fundamental in the crystal is then rotated toward the optic axis until the birefringence just equals the dispersion. Proper conditions for the embodiment of FIG. 1 may be obtained by using a uniaxial laser rod 12 which is cut so that the rooftop edge of the rooftop reflector or second reflecting means 18 is parallel to the optic axis of the laser rod 12. Then only polarized light vibrating parallel to the optic axis is generated. The nonlinear dielectric element 10 is oriented with its optic axis perpendicular to that of the laser rod 12 to provide an O-ray in the element 10 when a potassium dihydrogen phosphate crystal is used therefor. The element 10 is cut at the proper angle for equalizing the fundamental and harmonic wave velocities. Although the velocities of the waves $f_1$ and $f_2$ may not be equalized in the laser rod 12, its length can be adjusted so that the waves $f_1$ and $f_2$ after reflection by the rooftop reflector 18 arrive in phase at the interface 14 between the two elements 10 and 12. Thus, the first and second reflecting means 16 and 18 form a cavity 15 for both frequencies and the traveling wave interaction is maintained over a path equivalent to many times the actual length of the nonlinear dielectric element 10.

In FIG. 2 there is illustrated another embodiment of the system of the present invention which includes the laser rod 12 and the nonlinear dielectric element 10 having interposed therebetween a third reflecting means 17 which totally reflects the harmonic wave $f_2$ but readily transmits the fundamental wave $f_1$. The embodiment of FIG. 2 is otherwise similar to that illustrated in FIG. 1.

In the operation of the embodiment illustrated in FIG. 2, the coherent fundamental wave $f_1$ produced in the laser rod 12 passes through the third reflecting means 17 and the nonlinear element 10 to the first reflecting means 16 where it is reflected back to the third reflecting means 17 through the nonlinear element 10. The length of the nonlinear dielectric element 10 is such that the first and third reflecting means 16 and 17, respectively, form a cavity resonant at the harmonic frequencies $f_2$ and the total length of the element 10 and rod 12 is such that the first and second reflecting means 16 and 18, respectively, form a cavity resonant at the fundamental wave $f_1$. It can be seen that the embodiment of FIG. 2 is advantageously used when the laser rod 12 is made of material which absorbs a large amount of the energy of the harmonic wave.

In FIG. 3 there is illustrated an embodiment of the system of the present invention which includes a pair of lenses 26 and 28 spaced apart by twice their focal length and interposed between the laser rod 12 and the nonlinear dielectric element 10. A mask 30 having an aperture 32 is disposed in the common focal plane of the lenses 26 and 28.

In the operation of the system illustrated in FIG. 3 the coherent fundamental wave $f_1$ produced in the laser rod 12 passes through the nonlinear dielectric element 10 via the first and second lenses 26 and 28 and the aperture 32 in the mask 30. As the fundamental wave $f_1$ passes through the nonlinear dielectric element 10, the harmonic wave $f_2$ is created much in the same manner as explained hereinabove in connection with the embodiment illustrated in FIG. 1 of the drawing. An advantage of the embodiment of the system illustrated in FIG. 3 over those shown in FIGS. 1 and 2 is that the stringent requirements in regard to the length, flatness, and orientation of the elements are relaxed. By utilizing the lenses 26 and 28, the flat surfaces such as at the end of the laser rod 12, the ends of the nonlinear dielectric element 10 and the first reflecting means 16 no longer have to be flat and parallel, i.e. within a fraction of a wavelength of the waves $f_1$ and $f_2$. Thus, fabrication of the system elements, especially the nonlinear dielectric element 10 which is usually soft and difficult to polish, is greatly simplified. Furthermore, the nonlinear dielectric element 10 need not be cut at a precise angle with respect to the optical axis but can be rotated slightly in order to maximize the harmonic wave $f_2$. When the harmonic wave $f_2$ is not absorbed by the active element 12, the first and second reflecting means 16 and 18 form a resonant cavity at both the fundamental and harmonic waves $f_1$ and $f_2$ by simply adjusting the position of the second reflecting means 16 with respect to that of the first reflecting means. However, the length of the laser rod 12 must be such that the relative phase of the fundamental and harmonic waves $f_1$ and $f_2$ at the flat surface of the laser rod 12 must be the same before and after reflection by the second reflecting means 18. If the surfaces are not flat to a wavelength or less or if the system oscillates in a number of modes, this adjustment is not critical. The modes of oscillation of the system are controlled to some extent by placing the aperture 32 of the mask 30 at a common focal point of the lenses 26 and 28. If the laser rod 12 absorbs the harmonic wave $f_2$ then only the harmonic waves traveling through the dielectric element 10 toward the first reflecting means 16 are useful and the effective length of the traveling wave interaction is reduced.

The embodiment illustrated in FIG. 4 of the drawing is similar to that shown in FIG. 3 except for the means for extracting the harmonic wave from the cavity. The embodiment of FIG. 4 includes the laser rod 12, the lenses 26 and 28, the nonlinear dielectric element 10 and a 45° beam splitter 32, disposed in the path of the harmonic wave $f_2$, which exhibits very low reflectivity for the fundamental wave $f_1$ and relatively high reflectivity for the harmonic wave $f_2$, while being transparent at least in part to both the fundamental and harmonic waves $f_1$ and $f_2$. The beam splitter 32 may be a multilayer dielectric film. A fourth reflecting means 16', which totally reflects the fundamental and the harmonic waves $f_1$ and $f_2$, is used instead of the first reflecting means 16. The fourth reflecting means in cooperation with the second reflecting means 18 forms a resonant cavity for both the fundamental and harmonic waves $f_1$ and $f_2$.

In the operation of the embodiment of the invention illustrated in FIG. 4, the fundamental wave $f_1$ is generated in the laser rod 12 and passes through the nonlinear dielectric element 10 via the lenses 26 and 28 to produce in the nonlinear dielectric element 10 via the lenses 26 and 28 to produce in the nonlinear dielectric element 10 the harmonic wave $f_2$. The wave $f_2$, along with wave $f_1$, is reflected by both the second and fourth reflecting means 18 and 16', respectively, with a portion thereof being deflected into the detector 24 by the beam splitter 32.

The embodiment of the invention illustrated in FIG. 5 utilizes another alternative means for extracting the harmonic wave $f_2$ from the nonlinear dielectric element 10. In the embodiment of FIG. 5 a 30° prism 34 which is made of a dispersive medium has a face thereof in contact with the fourth reflecting means 16'. The prism 34 is oriented so that the fundamental wave $f_1$ emerges from the prism 34 along its original path after being reflected by the fourth reflecting means 16'. Thus, the fourth reflecting means 16' and the second reflecting means 18 form a resonant cavity for the fundamental wave $f_1$. However, due to dispersion in the prism 34, the harmonic wave $f_2$ of the fundamental wave $f_1$ emerges from the prism 34 at a different angle from that at which it entered the prism 34. Consequently, the emerging harmonic wave $f_2$ is focused by the lens 28 at a position which differs from that of the fundamental wave $f_1$. A small mirror 36 is disposed at the focal position of the harmonic wave $f_2$ deflects the beam of harmonic wave $f_2$ out of the cavity to the detector 24.

In the operation of the embodiment of FIG. 5, the coherent fundamental wave $f_1$ produced in the laser rod 12 passes through the nonlinear dielectric element 10 via the first and second lenses 26 and 28 to produce in the nonlinear dielectric element 10 the harmonic wave $f_2$ which is refracted by the prism 34 and deflected by the fourth reflecting means 16' to the small mirror 36 which directs the harmonic waves $f_2$ to the detector 24. It can be seen that the embodiment of FIG. 5 is operated without providing a resonant cavity for the harmonic waves $f_2$.

In FIG. 6 there is illustrated an embodiment of the system of the present invention which by optical mixing provides a coherent wave $f_0$ having a frequency equal to the difference or to the sum of two waves $f_1$ and $f_3$ directed through the nonlinear dielectric element 10. The embodiment of FIG. 6 includes the laser rod 12, which produces the wave $f_1$, aligned with and disposed on one side of the nonlinear dielectric element 10 and a second laser element or rod 12', which produces the wave $f_3$, aligned with and disposed on the opposite side of the nonlinear dielectric element 10. The second laser rod 12' has associated therewith pumping radiation 22' produced by any suitable pumping source, such as source 20 of FIG. 1 of the drawing, for producing the coherent wave $f_3$. The second laser rod 12' may be a calcium fluoride crystal doped with divalent samarium and operated to produce red coherent light as described in IBM Journal of Research and Development, Vol. 5, No. 1, Jan. 1961, pp. 56–58, by P. P. Sorokin et al. The third reflecting means 17 is interposed between the laser rod 12 and the nonlinear dielectric element 10 and a fifth reflecting means 19 is disposed between the second laser rod 12' and the nonlinear dielectric element 10. The third reflecting means 17 is transparent to the waves $f_1$ produced by the laser rod 12 but totally reflects the waves $f_3$ produced by the second laser rod 12' and waves $f_0$ generated within the nonlinear dielectric element 10 by the interaction between the waves $f_1$ and $f_3$. The fifth reflecting means 19 totally reflects the waves $f_1$, partially reflects the waves $f_0$ and totally transmits the waves $f_3$.

In the operation of the embodiment of FIG. 6, pumping radiation 22 excites the laser rod 12 to produce therein the coherent optical wave $f_1$ between the second reflecting means 18 and the fifth reflecting means 19 and pumping radiation 22' excites the second laser rod 12' to produce therein coherent waves $f_3$ between the first reflecting means 16 and the third reflecting means 17. Due to the interaction of the waves $f_1$ and $f_3$ in the nonlinear dielectric element 10, the third wave $f_0$ equal to the algebraic sum of the waves $f_1$ and $f_3$ is produced when both the waves $f_1$ and $f_3$ are traveling in the same direction in the element 10 and at equal phase velocities. The third wave $f_0$ is extracted from the nonlinear dielectric element 10 through the second active element 12' and the first reflecting means 16 and then intercepted by the detector 24. The third and fifth reflecting means 17 and 19, respectively, are spaced apart so as to provide a resonant cavity for the waves $f_0$.

The embodiment in FIG. 7 of the drawing illustrates another optical mixing system in accordance with the present invention. The embodiment of FIG. 7 includes the laser rod 12 which produces a first coherent optical wave $f_1$ directed through the nonlinear dielectric element 10, first reflecting means 16 which may be, for example, a multilayered dielectric film, first and second lenses 26 and 28 and an optical input source 38 for providing a second wave $f_s$, which may be a coherent or incoherent wave, to the nonlinear dielectric element 10. The wave $f_s$ passes through the element 10 via the first reflecting means 16, which means 16 in cooperation with the second reflecting means 18 defines a resonant cavity for the wave $f_1$. The waves $f_1$ and $f_s$ traveling through the element 10 at equal phase velocities produces a wave having a frequency $f_0$ equal to the algebraic sum of $f_1$ and $f_s$. A 45° beam splitter 40 is disposed between the second lens 28 and the nonlinear dielectric element 10 to deflect algebraic sum wave $f_0$ to the $f_0$ detector 25. The beam splitter 40 is transparent to the first wave $f_1$.

In the operation of the embodiment of FIG. 7, the first coherent wave $f_1$ produced in the active element 10 passes through the nonlinear dielectric element 10 before being reflected by the first reflecting means 16. After the wave $f_1$ is reflected by the means 16, it returns to the nonlinear dielectric element 10 to travel therein in a common direction and at equal velocity with the wave $f_s$ from the optical input signal source 38 to produce in the nonlinear dielectric element 10 the algebraic sum wave $f_0$ which after emerging from the nonlinear dielectric element 10 is deflected to the $f_0$ detector 25 by the 45° beam splitter 40. It can be seen that in the embodiment of FIG. 7, a resonant cavity is provided only for the first coherent wave $f_1$. For more detailed information relating to optical mixing reference may be had to A. W. Smith and N. Braslau, IBM Journal of Research and Development 6, 361 (1962); Journal of Applied Physics 34, 2105 (1963); Proceedings of the Symposium on Optical Masers, Polytechnic Institute of Brooklyn, pp. 529–537, 1963.

Figure 8:
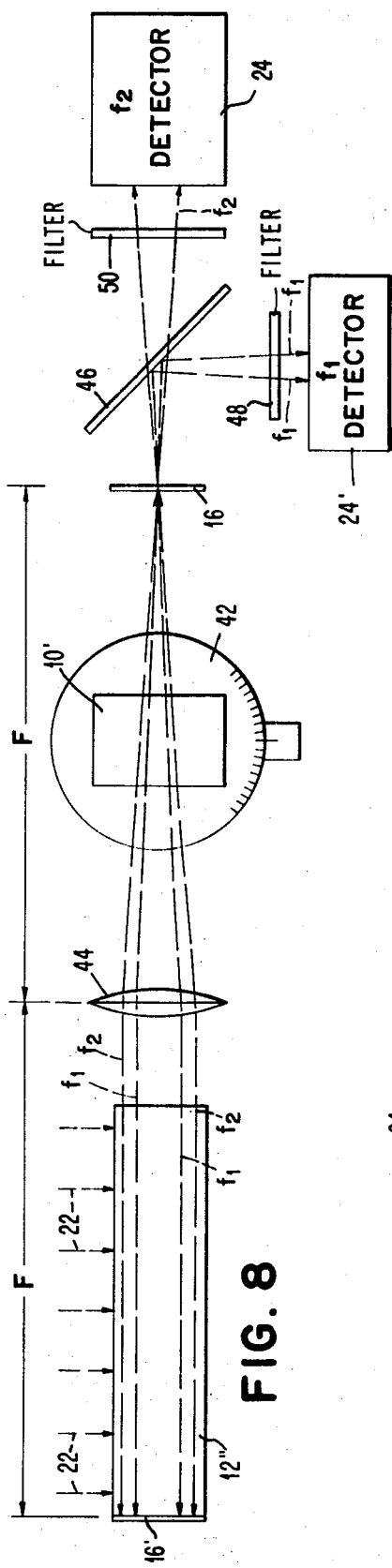
FIG. 8 illustrates an embodiment of the system of the present invention wherein a single lens is employed within and both the fundamental and the harmonic waves are extracted from a resonant cavity.

The embodiment of the invention illustrated in FIG. 8 of the drawing, provides output waves at the fundamental and harmonic frequencies. The embodiment of FIG. 8 includes a laser rod or element 12" having flat parallel opposite ends, on one end of which there is disposed the fourth reflecting means 16'. Pumping radiation 22 is applied to the laser rod 12" to produce a coherent fundamental wave $f_1$ within the resonant cavity formed by the fourth reflecting means 16' and the first reflecting means 16. Interposed between the first reflecting means 16 and the laser rod 12" is a nonlinear dielectric element 10' mounted on a rotatable horizontal table 42. A lens 44 is arranged between the nonlinear dielectric element 10' and the laser rod 12'' at a distance from the first reflecting means 16 equal to the focal length F of the lens 44. The first reflecting means 16 may be a quartz flat with a silver film disposed thereon which transmits about 1 percent of the fundamental wave $f_1$ and about 25 percent of the harmonic $f_2$ of the fundamental wave $f_1$. The mode structure in the system may be controlled by placing an apertured mask, such as mask 30 shown in FIG. 3, over the reflecting surfaces of the first reflecting means 16. If desired, the fourth reflecting means 16' may be positioned at a distance equal to the focal length F from the lens 44 and the size of the surface of the fourth reflecting means 16' reduced to control the mode structure. A 45° beam splitter 46 is disposed without the cavity formed by the first and fourth reflecting means 16 and 16', respectively, which deflects the fundamental wave $f_1$ to a $f_1$ detector 24' through a first filter 44 and which passes the harmonic wave $f_2$ to the $f_2$ detector 24 through a second filter 50.

In the operation of the embodiment of FIG. 8, the fundamental wave $f_1$ is produced by the laser rod 12'' in the cavity defined by the first and fourth reflecting means 16 and 16' resonant at the fundamental wave $f_1$ so as to provide within the nonlinear dielectric element 10 a strong fundamental electrical field which creates the harmonic wave $f_2$ to which the cavity formed by first and fourth reflecting means 16 and 16' is also resonant. The lens 44 directs the fundamental wave $f_1$ and the harmonic wave $f_2$ to its focal point at the first reflecting means 16. Since the first reflecting means 16 transmits a portion of the fundamental wave $f_1$ and a portion of the harmonic wave $f_2$, the harmonic wave $f_2$ will pass through the 45° beam splitter 46 and the filter 50 to the $f_2$ detector 24, while the fundamental wave $f_1$ will be deflected by the 45° beam splitter 46 to the $f_1$ detector 24' through the filter 48. The filter 48 is provided to attenuate all radiation with the exception of the fundamental wave $f_1$ and the filter 50 is provided to attenuate all radiation with the exception of the harmonic wave $f_2$.

The peak harmonic power measured in one of the successful operations of the embodiment shown in FIG. 8 was 1.5 milliwatts, corresponding to an internal power of 6.0 milliwatts in a ruby laser rod. The wavelength of the fundamental wave $f_1$ was 6,940 Angstroms and that of the harmonic wave $f_2$ was 3,470 Angstroms. The faces of the nonlinear dielectric element 10', which was a potassium dihydrogen phosphate crystal, were cut perpendicular to a direction which was at an angle of 46° to the optic or Z-axis and at 45° to both the X and Y crystallographic axes. The first reflecting means 16 and the ends of the ruby laser rod 12'' were flat to about one-tenth wavelength, but the sides of the element 10 were flat to only about 20 wavelengths. The sides of the element 10' has a wedge angle therebetween of about one-half degree. The first reflecting means 16 and the fourth reflecting means 16' were aligned parallel within several minutes of arc by means of an autocollimator. The ruby rod 12'' was excited by a helical flash tube placed around it and pulsed from a 400-microfarad capacitor (not shown) charged to 4,000 volts. The excitation was only slightly above the threshold value at which coherent radiation is produced in the rod 12'' but by properly orienting the element 10' by means of the rotatable table 42, the relatively large harmonic wave $f_2$ was produced. At the maximum, harmonic intensity, the fundamental or red wave $f_1$ was incident on the dielectric element about 6° from the face normal.

The peak harmonic power outside the cavity of the embodiment of FIG. 8 was 1.5 milliwatts when the peak red fundamental wave power outside the cavity was only about 9 watts, which wattage would produce a negligible amount of harmonic power in an externally mounted nonlinear dielectric element. As indicated hereinabove, the oscillations or fundamental wave $f_1$ produced by the red laser rod 12'' was relatively weak. When the same element 10' was placed in front of a powerful ruby laser having external peak powers of about 2,000 watts, a harmonic output of about only 5 milliwatts was obtained. By placing the element 10' inside the cavity of a similarly powerful laser having no external output at the fundamental wave, considerably larger harmonic waves are obtained.

Figure 9:
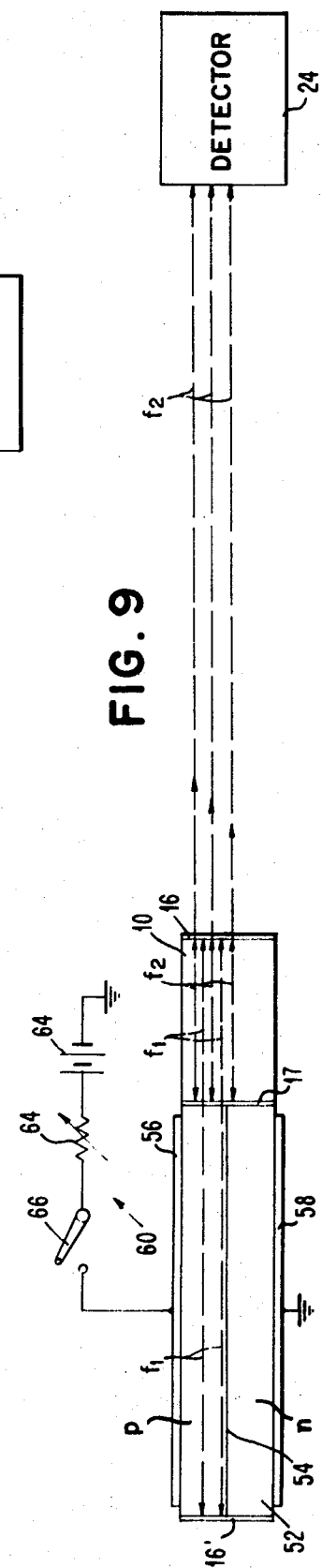
FIG. 9 illustrates an embodiment of the system of the present invention wherein a harmonic is produced in a fundamental optical wave derived from an injection laser.

In the embodiment of the invention illustrated in FIG. 9 of the drawing, the system utilizes an injection laser as the source which produces the fundamental wave $f_1$. The embodiment of FIG. 9 includes a semiconductor element 52, for example, made of gallium arsenide, having P and N layers forming a P-N junction 54, such as is described in Applied Physics Letters, Vol. 1, No. 3, Nov. 1, 1962, pp. 62–64, by M. I. Nathan et al. First and second electrodes 56 and 58 are applied to opposite surfaces of the semiconductor element 52. A circuit 60 for supplying current to the semiconductor element 52 through the first and second electrodes 56 and 58 includes a battery 62, a variable resistor 64 and a switch 66. Disposed at one end of the semiconductor element 52 and aligned therewith is the nonlinear dielectric element 10. Interposed between the semiconductor element 52 and the nonlinear dielectric element 10 is the third reflecting means 17 which totally reflects the harmonic wave $f_2$ of the fundamental wave $f_1$ but readily transmits the fundamental wave $f_1$. At the end of the semiconductor element 52, opposite the one end thereof is disposed the fourth reflecting means 16' which totally reflects the fundamental wave $f_1$. The first reflecting means 16 is disposed on the end of the nonlinear dielectric element 10 opposite that on which the third reflecting means 17 is located. The first reflecting means 16 totally reflects the fundamental wave $f_1$, but partially transmits the harmonic wave $f_2$. The lengths of the semiconductor element 52 and the nonlinear dielectric element 10 are such that the first and fourth reflecting means 16 and 16' form a resonant cavity for the fundamental wave $f_1$ and the first and third reflecting means 16 and 17, respectively, form a resonant cavity for the harmonic wave $f_2$. A detector 24 is disposed to intercept the harmonic wave $f_2$ as it emerges from the element 10 through the first reflecting means 16.

In the operation of the embodiment of the invention illustrated in FIG. 9, the switch 66 is closed and the variable resistor 64 is adjusted to supply current to the semiconductor element 52 sufficient to exceed the threshold at which coherent radiation or the fundamental wave $f_1$ is produced within, the cavity formed by the first and fourth reflecting means 16 and 16'. The harmonic wave $f_2$ is produced in the nonlinear dielectric element 10 as the fundamental wave $f_1$ repeatedly passes therethrough and is detected by the detector 24 as it emanates from the nonlinear dielectric element 10 through the first reflecting means 16.

It should be understood that the interactions between optical electric fields produced in the system of the present invention create not only waves in the optical region of the electromagnetic wave spectrum but also waves outside the optical region. For example, two optical waves may be mixed in accordance with this invention to produce a resultant wave in the microwave region having a frequency equal to the difference in frequency of these two optical waves. The microwave energy may be extracted from the system by a suitable waveguide arrangement such as described in the above-identified U.S. Pat. application Ser. No. 205,951.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A laser harmonic generator comprising an active laser element, means for exciting the said active laser element, two reflectors located one each side of the said active laser element for providing cumulative reflections of radiation at a fundamental frequency of the active laser element and a crystal having nonlinear dielectric properties located in the path of the said cumulative reflections between the said active laser element and one of the said reflectors and having its crystalline axes at a critical orientation relative to the path through the crystal of the said cumulative reflections so that the phase velocity within the crystal in the direction of the said path of the said radiation at the fundamental frequency is substantially the same as the phase velocity within the crystal in the direction of the said path of a chosen harmonic of the said fundamental frequency, and wherein both of the said reflectors are substantially totally reflecting at the said fundamental frequency, and wherein at least one of the said reflectors is translucent to the said chosen harmonic of the fundamental frequency.

2. The harmonic generator of claim 1, wherein said crystal is potassium dihydrogen phosphate.

3. The harmonic generator of claim 1 wherein a lens system is located between said active laser element and said crystal, said lens system including a pair of lenses spaced apart by a distance equal to the sum of their focal lengths, and a mask having an aperture therein disposed at the focal length of one of said lens.

4. A system comprising:
 a. a laser rod in an optical cavity,
 b. means for exciting said rod to produce a fundamental coherent optical wave,
 c. a nonlinear piezoelectric element disposed within said cavity and affixed to said rod for producing a harmonic wave of said fundamental wave, said piezoelectric element being transparent to both the fundamental and said harmonic wave and
 d. means for extracting said harmonic wave from said cavity.

5. A system comprising:
 a. an injection laser for producing a given coherent optical wave and having a cavity resonant to said given wave,
 b. a nonlinear dielectric element disposed within said cavity so as to produce therein a harmonic wave of said given wave,
 c. means for providing a second cavity resonant to said harmonic wave embracing said nonlinear dielectric element and
 d. means for extracting said harmonic wave from said second cavity.